(12) United States Patent
Tilmant

(10) Patent No.: US 9,510,558 B2
(45) Date of Patent: Dec. 6, 2016

(54) SANITATION DEVICE FOR DOMESTIC ANIMALS

(71) Applicant: M. Tanguy Tilmant, Limal (BE)

(72) Inventor: M. Tanguy Tilmant, Limal (BE)

(73) Assignee: ALTERNATECH, Limal (BE)

( * ) Notice: Subject to any disclaimer, the term of this patent is extended or adjusted under 35 U.S.C. 154(b) by 33 days.

(21) Appl. No.: 14/412,701

(22) PCT Filed: Jul. 5, 2013

(86) PCT No.: PCT/EP2013/064316
§ 371 (c)(1),
(2) Date: Jan. 5, 2015

(87) PCT Pub. No.: WO2014/006211
PCT Pub. Date: Jan. 9, 2014

(65) Prior Publication Data
US 2015/0150213 A1    Jun. 4, 2015

(30) Foreign Application Priority Data

Jul. 6, 2012    (EP) .................................... 12175351

(51) Int. Cl.
*A01K 1/01*    (2006.01)

(52) U.S. Cl.
CPC ............. *A01K 1/0121* (2013.01); *A01K 1/011* (2013.01)

(58) Field of Classification Search
CPC ........ A01K 1/0107; A01K 1/11; A01K 1/121; E03C 1/01
USPC ....................... 119/161, 162, 163, 165; 4/663
See application file for complete search history.

(56) References Cited

U.S. PATENT DOCUMENTS

| 3,793,987 | A | * | 2/1974 | Rogers | ................. | A01K 13/001 |
| | | | | | | 119/161 |
| 5,184,574 | A | | 2/1993 | Kirk et al. | | |
| 6,446,576 | B1 | * | 9/2002 | King | ........................ | A01K 7/02 |
| | | | | | | 119/162 |
| 6,792,628 | B1 | * | 9/2004 | Humphrey | ............. | A01K 1/011 |
| | | | | | | 4/300 |

FOREIGN PATENT DOCUMENTS

| DE | 19903953 | 8/2000 | | |
| NL | 1014979 | 10/2001 | | |
| RU | WO 2010146611 A1 | * 12/2010 | ........... | A01K 1/0121 |

OTHER PUBLICATIONS

"Patent Translate", Translation of DE 199 03 953, Published on Aug. 3, 2000.*

* cited by examiner

*Primary Examiner* — Joshua Rodden
(74) *Attorney, Agent, or Firm* — Jerold I. Schneider; Schneider Rothman Intellectual Property Law Group, PLLC

(57) ABSTRACT

An area for accommodating a domestic animal, which is arranged to receive the excretions thereof and which includes an animal discharge-pipe leading into a human discharge-pipe placed between an area for accommodating humans, which is arranged to receive the excretions of the latter, and a sewage-discharge pipeline, the area for accommodating a domestic animal further including a rotatable sealing device having a first position for enabling the animal excretions to be received, and a second position for enabling the animal excretions to be discharged.

13 Claims, 4 Drawing Sheets

SANITATION DEVICE FOR DOMESTIC ANIMALS

CROSS-REFERENCE TO RELATED APPLICATIONS

This application is the entry into the United States of PCT Application No. PCT/EP2013/064316 filed Jul. 5, 2013 and claims priority to European Application EP12175351.1 filed Jul. 6, 2012, the entirety of each of which is hereby incorporated by reference.

BACKGROUND

The present invention relates to an area for accommodating a domestic animal (see also documents DE 19903953 or NL1014979) which is arranged to receive the excretions thereof and which includes an animal waste discharge pipe leading into a human waste discharge pipe placed between an area for accommodating humans, which is arranged to receive the excretions of the latter, and a sewage discharge pipe line, the said area for accommodating a domestic animal further including a rotatable sealing device having a first position for enabling the receiving of the said animal excretions, and a second position for enabling the discharge of the said animal excretions (see also document U.S. Pat. No. 5,184,574).

Such a device is known for example from the document WO2010/146611, which describes a sanitation device that combines a toilet system for human use with an animal litter box unit. The area containing the animal litter box unit is connected to the said human toilet system in order to ensure the discharge of animal excretions by means of the existing discharge system of the human toilet. According to a preferred embodiment described in this document, the litter box unit is contained in an area designed to accommodate the domestic animal and which is connected to an animal waste discharge pipe leading into the discharge outlet pipe of the human toilet which is itself connected to a sewage discharge pipe line.

Unfortunately, such a sanitation device requires the intervention of the owner of the domestic animal because once the animal has attended to its biological needs, it is not only necessary to activate a flush manually in order to discharge the soiled litter but also to replace the litter. Moreover, the activation of the flush results in the flushing out of the entire area for accommodating the animal, which is not suitable in view of ensuring the provision of fresh clean and dry litter. The user must thus wait for the animal accommodation area to completely dry out or wipe it off prior to placing the new litter therein. Such a device may also prove to be somewhat of a safety hazard for the domestic animal, which could for example get a paw stuck in the opening of the animal waste discharge pipe which is covered only by a layer of litter. If the domestic animal were to encounter and experience such a situation, it is reasonable to assume that it would be longer be inclined to use the sanitation device again. Moreover, such a device does not provide any means of ensuring that the litter is securely maintained in the animal accommodation area, thus the litter could run into the animal waste discharge pipe even before being used. Only a small pipe diameter on the animal waste discharge pipe makes it possible to limit the run of unused litter into the drainage pipes and provides the ability to minimise the risks (hazards) for the domestic animal. However, the smaller that the diameter of the animal waste discharge pipe is, the greater would be the risk of formation of blockages and clogging in this very pipe. Indeed, if the pipe were to have a small diameter, the litter material, usually marketed in the form of wood shavings and made sticky by the animal excretions would have a tendency to stick to the walls of the pipes, which would result in blockages and, as a consequence thereof, cause fairly significant discharge related problems.

In order to at least partially resolve these problems, provision is made according to the invention, for an area for accommodating a domestic animal as indicated at the beginning of this description, characterised by the fact that the said rotatable sealing device separates and isolates the said area for accommodating a domestic animal from the said animal waste discharge pipe.

An area for accommodating an animal that includes such a rotatable sealing device, which separates and isolates the said area for accommodating an animal, from the said animal waste discharge pipe is free of risk for the domestic animal since the said device prevents entry or contact with the animal waste discharge pipe. This rotatable sealing device also makes it possible to use an animal waste discharge pipe having any diameter since it is isolated from the said area for accommodating an animal. This is particularly advantageous for ensuring optimum discharge of excretions, in which respect, the larger that the diameter of the animal waste discharge pipe is, the less readily would the excretions adhere to the walls of this very pipe. The problems of blockages mentioned above may thus be easily avoided. On the other hand, the presence of a rotatable sealing device minimises the incidence of odours from the said animal waste discharge pipe being carried up to the said area for accommodating an animal, which contributes to optimal hygiene conditions.

SUMMARY

According to the present invention, the said rotatable sealing device may be, for example, a cylinder provided with a central horizontal axis parallel to a horizontal plane. This cylinder advantageously has at least two cavities that are diametrically opposite and curved over the entire length of the said cylinder, the said cavities being located for example, in a trigonometric frame of reference of which the axes are superposed over the medians of the section of the cylinder taken in the middle, for one between 315° and 45° and the other between 135° and 225°. Based on a rest position, prior to rotation of the said rotatable sealing device, the cavity included between 45° and 315° opens on to the said area for accommodating an animal, and can thus receive the excretions of the animal. A 180° rotation of this rotatable sealing device will serve to move the excretions to the said animal waste discharge pipe and bring about a positioning of the cavity initially situated between 135° and 225° to a position situated between 315° and 45°.

It is obviously understood that the said cylinder may comprise more than two cavities, for example three or four arranged symmetrically in relation to the said trigonometric frame of reference. In this case, in order to pass from the said first position arranged so as to allow for the receiving of the excretions of the animal, to a second position arranged so as to allow for the discharge of the excretions of the animal, the said cylinder is to be rotated at a pitch equal to 1/n revolution where n is equal to the number of cavities present on the cylinder.

On an alternative basis, according to the present invention, the said rotatable sealing device may be, for example, a rotary slide valve provided with a vertical central axis and whose surface is substantially planar and parallel to a horizontal plane. The said rotary slide valve comprises a first and a second superposed slides, each of the said slides comprising n sections that are alternately solid or hollow, with n being an even number.

When the said rotary slide valve is in the open position, a hollow section of the said first slide is superposed and is found to be in front of a hollow section of the said second slide, which creates an opening and enables the bringing about of communication between the said animal waste discharge pipe and the said area for accommodating the animal. This enables the effective discharge of the excretions of the animal following their drop under the effect of gravity into the said animal waste discharge pipe from the said area for accommodating the animal.

When the said rotary slide valve is in the closed position, a hollow section of the said first slide is superposed and is found to be in front of a solid section of the said second slide. In this case, no communication is possible between the said animal waste discharge pipe and the said area for accommodating the animal. It is indeed understood, in an equivalent fashion, that a solid section of the said first slide can be superposed on to a hollow section of the said second slide in order to obtain the closed position of the said rotary slide valve.

Bringing about rotation of the said rotary slide valve thus enables the passing thereof from an open to a closed position and vice versa, this occurring by superposing two hollow sections of each of the said slides or by superposing one hollow section of one of the two slides over one solid section of the other slide. The said rotary slide valve should thus perform a rotation at a pitch of 1/n revolution in order to pass from the said first position arranged so as to allow for the receiving of the excretions of the animal, to a second position arranged so as to allow for the discharge of the excretions of the animal.

Advantageously, the area for accommodating an animal according to the invention includes a water inlet pipe connected to the said animal waste discharge pipe. This pipe is connected to a water reservoir that releases a predetermined volume of water in order to carry out the flushing of the said animal waste discharge pipe. The said release of a predetermined volume of water may, in addition, be brought about by means of a solenoid valve connected directly to a water supply pipe and not to a water reservoir. Prior to and following the rotation of the said rotatable sealing device, the animal excretions would have been discharged in the said animal waste discharge pipe. The fact that the flushing of excretions is carried out at the level of the said animal waste discharge pipe is particularly advantageous since this localised flushing makes it possible to maintain the said area for accommodating the animal in dry condition and therefore ready to be used again right away. When the said rotary sealing device is a cylinder comprising at least two cavities, the flushing may be performed with a jet of pressurised water that flushes both the said animal waste discharge pipe, as well as, by means of deflection of the jet of pressurised water on to the walls of the said animal waste discharge pipe, the said cavity situated in the said animal waste discharge pipe.

The rotatable sealing device is preferably formed out of a non-porous material and is mounted on a vertical or horizontal axis located in the said animal waste discharge pipe. The rotation of this rotatable sealing device makes it possible to pass from a first position to a second position and vice versa during the absence of the domestic animal in the said area for accommodation intended for it.

Preferably, according to the invention, the said area for accommodating the animal is connected to a litter material tank provided with a volumetric dispensing valve in order to release a predetermined amount of litter material into the said area for accommodating the animal. Preferably, the said litter material is a water soluble and plant based litter material. Possibly, the said litter material may be guided by way of a pipe or a ramp in order to get to the level of the said rotatable sealing device.

Advantageously, according to the present invention, the said area for accommodating the animal is separated from the said area for accommodating human users by a wall, for example by a wall like structure or partition. Preferably, this wall or partition is provided with an access opening for introducing the said animal into the area for accommodating the animal. This opening may possibly be provided with a closure system, for example with a door.

In this way, the area for accommodating an animal may be appropriately built in and isolated from the human toilet, which, for reasons of hygiene, is particularly suitable. The built in installation of the said area for accommodating an animal and possibly the water reservoir and/or the litter material tank moreover also provides the ability to minimise the space occupied by the sanitation device meant for use by the animal, which constitutes a considerable advantage in tight spaces such as the toilets or bathrooms in a housing unit.

Advantageously, the said area for accommodating an animal according to the present invention has a wall, having a bottom that is inclined at an angle a relative to a horizontal plane. This inclination helps to guide the litter material supplied and/or manipulated by the said domestic animal towards the said rotatable sealing device. This inclination also facilitates the manual cleaning of the said area for accommodating an animal when it is appropriate to carry out such a cleaning operation.

In an equally advantageous manner according to the present invention, the said area for accommodating an animal includes at least one animal sensor for detecting the presence of the animal (entry into or exit out of the area for accommodating an animal), for example a volumetric motion detector, an optical sensor, a thermal sensor or any other suitable type of detector, connected to an electronic control-management system, which is itself connected to a control panel accessible to the user. Based on the said at least one detector detecting the entry and exit of the animal into and out of the said area for accommodating an animal, a cycle of operation will be implemented as described here below.

Preferably, and essentially if the said area for accommodating an animal according to the invention is built in, for example behind a wall or a wall like structure, a light source may be provided so as to ensure that the animal does not find itself confined in a dark place.

Advantageously, the said animal waste discharge pipe is extended by a siphon that serves to prevent the escaping of odours from the said animal waste discharge pipe and from the said sewage discharge pipe line. The presence of a siphon is advantageous because it allows for the dissolving of the litter material in its bottom part that is filled with water prior to its passing into the said human waste discharge pipe.

Preferably, the said area for accommodating an animal includes a maintenance hatch in order to facilitate the maintenance thereof, for example to enable performing of a manual cleaning of the said area for accommodating an animal when this becomes necessary.

Other embodiments of the area for accommodating a domestic animal according to the invention are indicated in the claims appended herein.

The object of the invention also relates to an operation method for the operation of a sanitation device for use by a domestic animal. This method includes the following sequential steps detection of the entry of a domestic animal into the said area for accommodating an animal by at least one motion detector;

detection of the exit of the said domestic animal out of the said area for accommodating an animal by at least one motion detector;

bringing about the rotation of the said rotatable sealing device according to a predetermined pitch in order to pass from a first position arranged so as to allow for the receiving of the excretions of the animal, to a second position arranged so as to allow for the discharge of the excretions of the animal.

As a consequence thereof, such a method is totally automatic, safe for the animal and allows for the rapid resumption of use of the said area for accommodating the animal. Indeed, the presence of at least one motion detector for detecting the presence (entry) therein or the absence (exit) of the animal from the said area for accommodating the animal provides the ability to automate the entire operation of the sanitation device for use by a domestic animal. No intervention by the owner of the animal is required, with the various different sequential steps being controlled by an electronic control-management system.

At all times, the said animal waste discharge pipe is thus properly isolated from the said area for accommodating the animal and it is thus not possible for the animal to get in there, not even just partially. The rotating of the said rotatable sealing device being brought about only following the detection of the exit of the animal from the said animal accommodation area, thereby enhances the safety of the sanitation device for use by a domestic animal according to the present invention.

Advantageously, according to the present invention, the method of operation of a sanitation device for use by a domestic animal further includes an additional step of cleaning of the said animal waste discharge pipe by flushing by means of supplying a predetermined volume of water from the said water reservoir to the said animal waste discharge pipe. This additional step enables the flushing of the said animal waste discharge pipe wherein animal excretions and/or the soiled litter material have previously dropped following the rotating of the said rotatable sealing device. It therefore involves a localised flushing within the said animal waste discharge pipe that provides the ability to maintain the said area for accommodating an animal in a dry condition and ready to accommodate the animal again. In addition, such a localised flushing serves to reduce the consumption of water needed to bring about the optimal discharge of animal excretions.

Preferably, according to the present invention, the method of operation of a sanitation device for use by a domestic animal further includes an additional step of supplying of clean and fresh litter material from a litter tank to the said area for accommodating an animal.

Other embodiments of the method of operation of a sanitation device for use by a domestic animal according to the invention are indicated in the claims appended herein.

Other characteristic features, details and advantages of the invention will become apparent from the description given here below, by way of non-limiting example and with reference made to the accompanying drawings.

BRIEF DESCRIPTION OF THE DRAWINGS

In the figures, elements that are identical or similar bear the same reference numerals.

DETAILED DESCRIPTION

Figure 1:
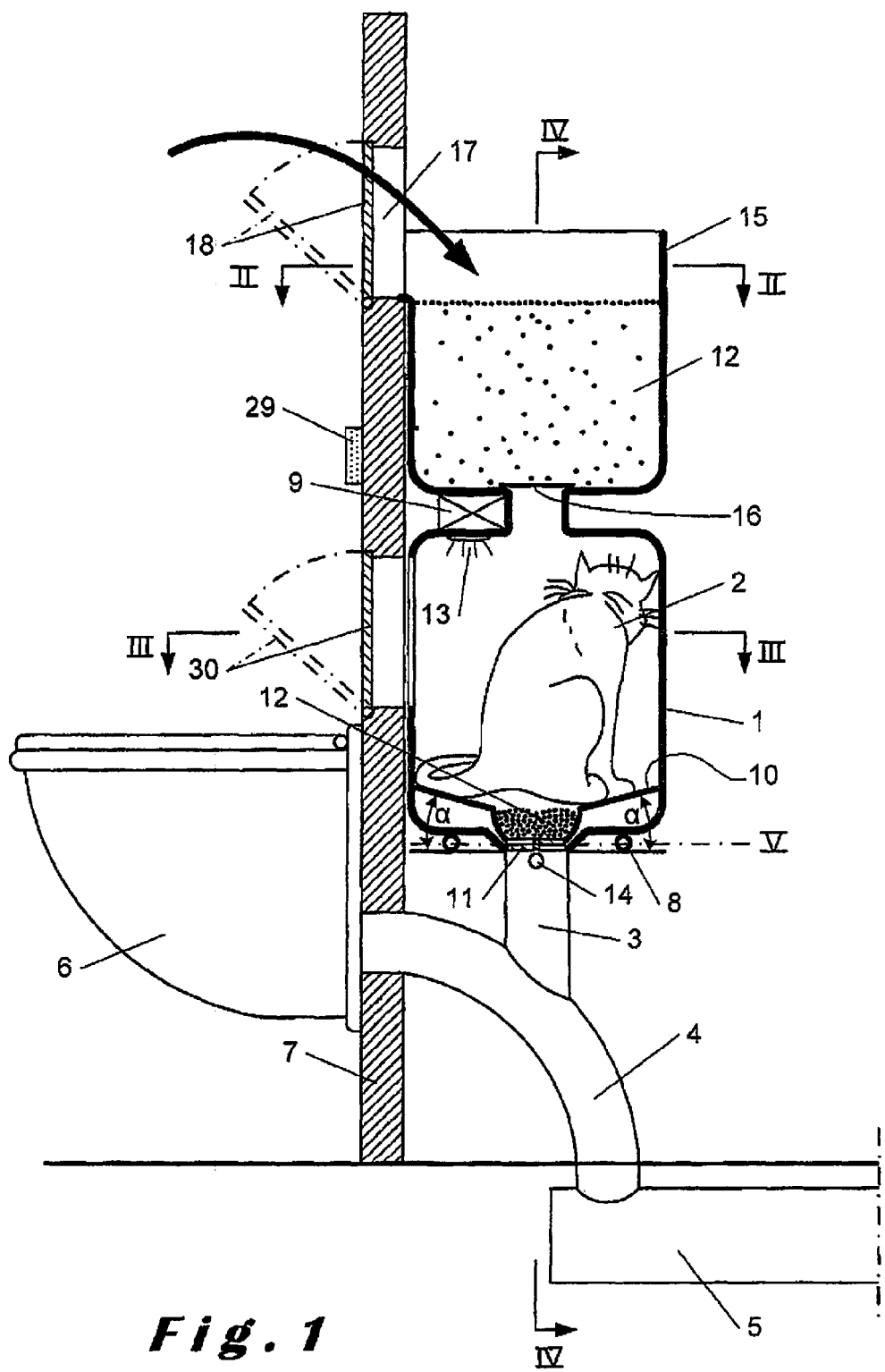
FIG. 1 is a schematic view of a sanitation device for use by a domestic animal according to the invention.

FIG. 1 illustrates an accommodation area (1) for accommodating a domestic animal (2) including an animal waste discharge pipe (3) leading into a human waste discharge pipe (4), which is itself connected to a sewage discharge pipe line (5). The human waste discharge pipe (4) connects the said sewage discharge pipe line (5) to an area for accommodating a human user (toilet bowl) (6) fixed to a wall (7).

The said accommodation area (1) for accommodating a domestic animal (2) is provided with volumetric motion detectors (8) arranged in order to detect the presence (entry) or absence (exit) of the animal (2). These detectors (8) are connected to an electronic control-management system (9) that will enable and engender the implementation of operation cycles based on the signals received and transmitted by the said detection sensors (8). The electronic control-management system (9) is itself connected to a control panel (29) to which the user has access. Moreover, the said accommodation area (1) for accommodating a domestic animal (2) has a bottom wall (10) that is inclined at an angle a relative to a horizontal plane. Furthermore, the said accommodation area (1) for accommodating a domestic animal (2) includes a rotatable sealing device (11) in the form of a rotary slide valve comprising a first and a second superposed slides, each of the said slides comprising 6 sections that are alternately solid (26, 28) or hollow (27) (as illustrated in the FIGS. 5a and 5b). This rotatable sealing device (11) is arranged in order for separating and isolating the said animal accommodation area (1) from the said animal waste discharge pipe (3). This rotatable sealing device (11) is covered by a layer of litter material (12) meant to be used by the animal (2).

In addition, the said animal accommodation area (1) is provided with a maintenance hatch (30) that facilitates the maintenance thereof when so necessary.

When the animal (2) enters into the said animal accommodation area (1), its presence is detected by the volumetric motion detectors (8) and a source of light (13) is activated so that the animal (2) does not find itself in the dark while it is attending to its biological needs.

When the animal (2) leaves the said animal accommodation area (1), its exit is detected by the volumetric motion detectors (8) which send this information to the electronic control-management system (9) in order for the said light source (13) to be turned off. The process of bringing about the rotation of the rotatable sealing device (11) is then carried out at a predetermined pitch, the said rotation being controlled by the said electronic control-management system (9). This rotation will thus serve so as to ensure that a hollow section of the said first slide is superposed and is found to be in front of a hollow section of the said second slide, which creates an opening and enables the bringing about of communication between the said animal waste discharge pipe (3) and the said area for accommodating (1) the animal (2). This enables the effective discharge of the excretions of the animal following their drop under the effect of gravity into the said animal waste discharge pipe (3) from the said area for accommodating the animal (1).

Bringing about this rotation results in the discharge of the litter material (12) soiled with the excretions of the animal (2).

Following this opening of the said rotatable sealing device (11), a further rotation action is to be carried out in order to ensure the closure thereof. During this further rotation action, a hollow section (27) of the said first slide is superposed and is found to be in front of a solid section (26) of the said second slide. In this case, no communication is possible between the said animal waste discharge pipe (3) and the said area for accommodating the animal (1). Furthermore, when the said rotary slide valve is in the closed position, the solid section (28) of the said first slide is apparent.

Subsequently, a predetermined volume of water is injected into the said animal waste discharge pipe (3) through a water supply pipe (14) connected to a water reservoir (illustrated in FIG. 2 under no 19). The flushing out of the said animal waste discharge pipe (3), wherein the soiled litter material (12) has been dropped by virtue of gravity, is thus carried out. This flushing is localised and takes place only at the level of the said animal waste discharge pipe (3), which provides the ability to avoid wetting the said accommodation area (1) for accommodating the animal (2) since the said rotatable sealing device (11) isolates the said animal discharge pipe (3) from the said area for accommodating (1) the animal (2).

Finally, fresh litter material (12) is brought into the said area for accommodating (1) the animal (2) through the release thereof from a litter material tank (15) equipped with a volumetric dispensing valve (16) controlled by the said electronic control-management system (9). The litter material (12) therefore drops by virtue of gravity following the opening of the volumetric dispensing valve (16) which is closed when a predetermined volume of litter material (12) has been released into the said area for accommodating (1) the animal (2). The said litter material tank (15) may be filled (as indicated by the arrow) via an opening (17) formed in the said wall (7) and provided with a door (18).

Figure 2:
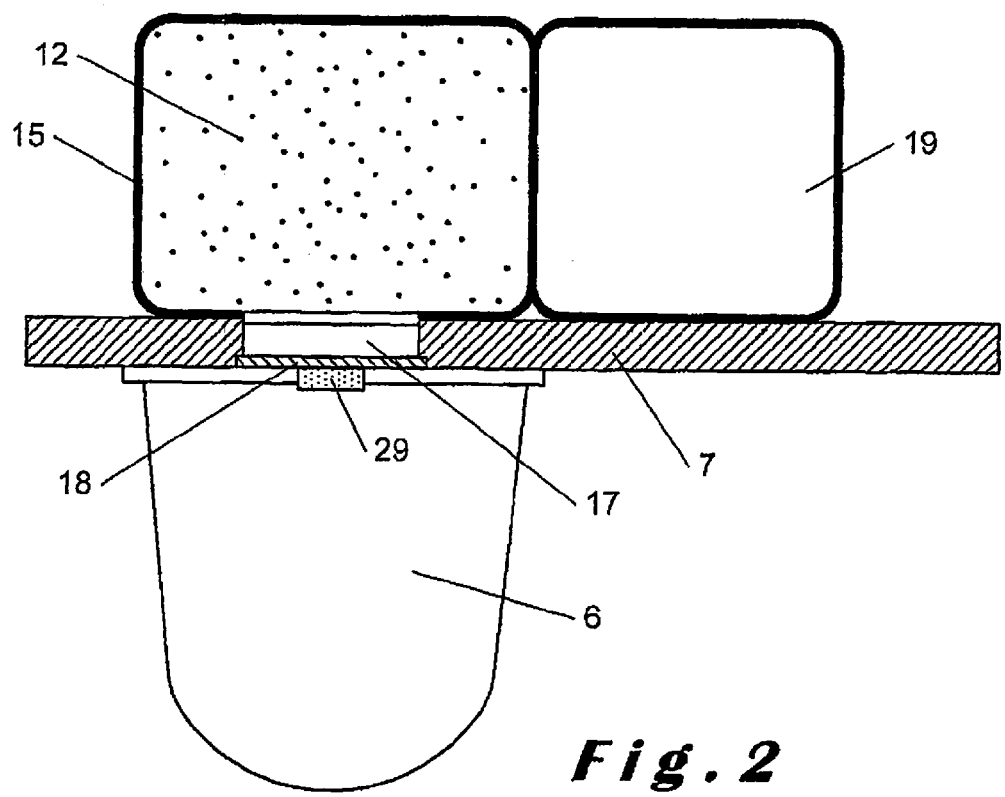
FIG. 2 is a view from the top of a sanitation device for use by a domestic animal according to the invention along the cross sectional line II of FIG. 1.

In FIG. 2, which is a view from the top (along the axis II) as in FIG. 1, a water reservoir (19) is placed next to the litter material tank (15). This water reservoir (19) is connected, via a water supply pipe (14) (illustrated in FIGS. 1 and 4) to the animal waste discharge pipe (3).

Figure 3:
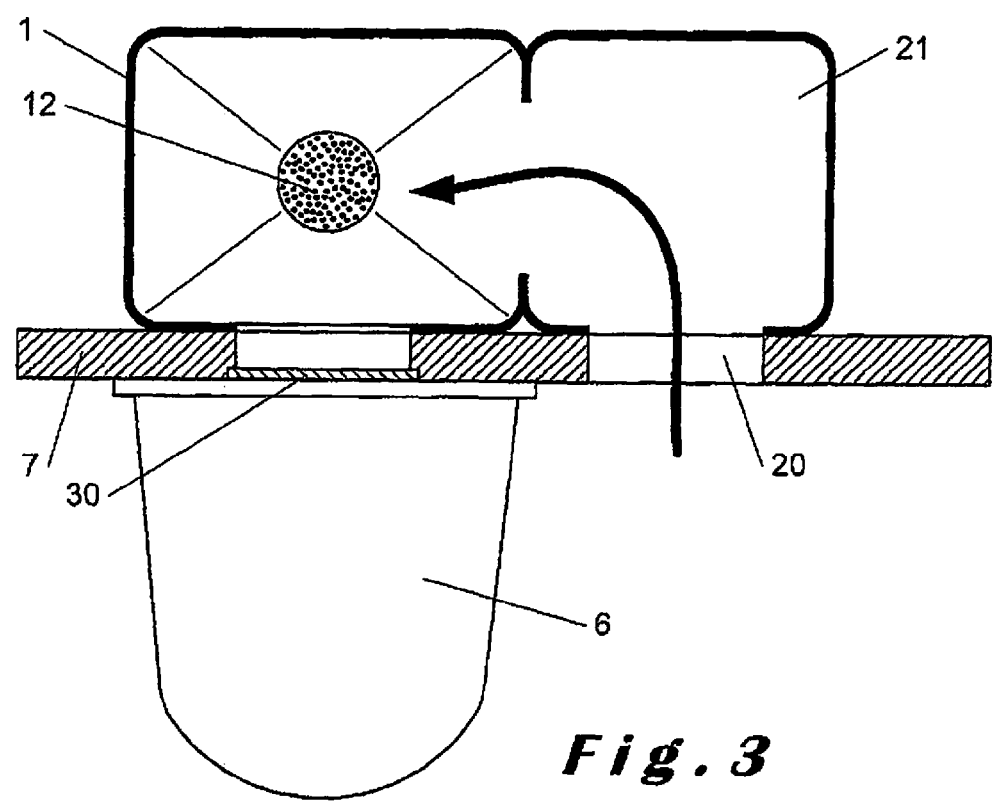
FIG. 3 is a cross sectional view from the top of a sanitation device for use by a domestic animal according to the invention along the cross sectional line III of FIG. 1.

In FIG. 3, which is a cross sectional view from the top (along the axis III) as in FIG. 1, an access opening (20) for introduction therein of the animal (2) is illustrated. This access opening (20) is formed in the wall (7) and gives access to the animal (2) to a passage (21) that is open towards the said accommodation area (1). Possibly, the said access opening (20) is provided with a door (not illustrated).

Figure 4:
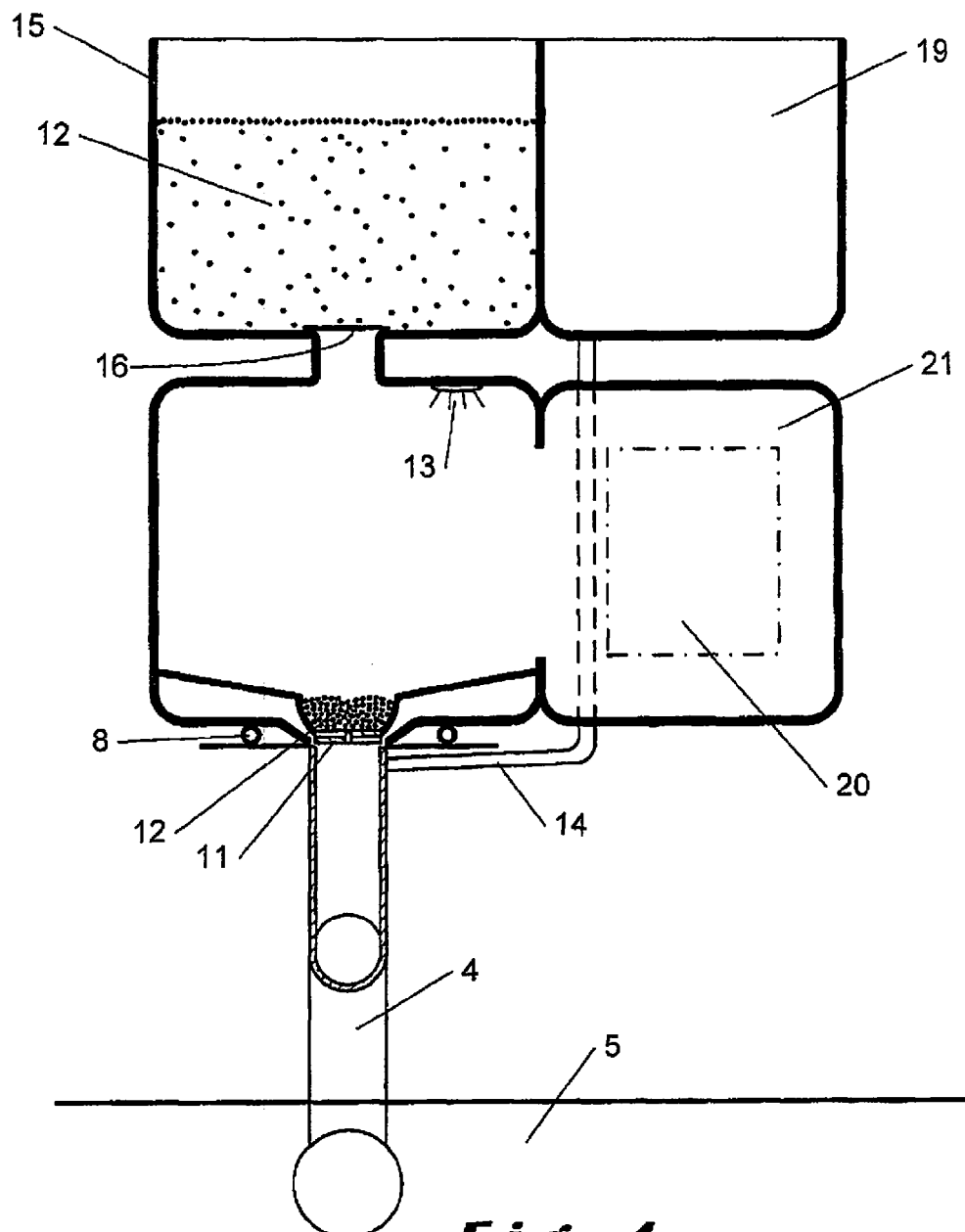
FIG. 4 is a cross sectional view of a sanitation device for use by a domestic animal according to the invention along the cross sectional line IV of FIG. 1.

In FIG. 4, which is a view in cross section along the axis IV as in FIG. 1, all of the elements described in FIGS. 1 to 3 are illustrated.

Figure 5A:
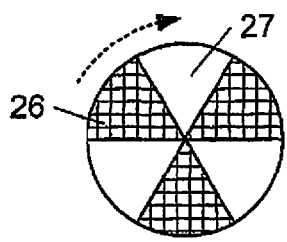
FIGS. 5a and 5b are cross sectional views from the top of a sanitation device for use by a domestic animal according to the invention along the cross sectional line V of FIG. 1.
Figure 5B:
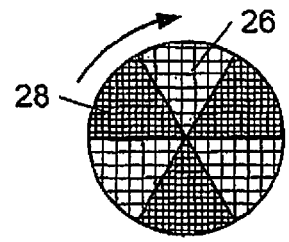

In FIGS. 5a and 5b, which are cross sectional views from the top (along the axis V) as in FIG. 1, the rotatable sealing device in the form of a rotary slide valve is illustrated in the open position (a) and in the closed position (b).

When the said rotary slide valve is in the open position (FIG. 5a), a hollow section (27) of the said first slide is superposed and is found to be in front of a hollow section of the said second slide, which creates an opening and enables the bringing about of communication between the said animal waste discharge pipe (3) and the said area for accommodating the animal (1). This enables the effective discharge of the excretions of the animal following their drop under the effect of gravity into the said animal waste discharge pipe (3) from the said area for accommodating the animal (1).

When the said rotary slide valve is in the closed position (FIG. 5b), a hollow section (27) of the said first slide is superposed and is found to be in front of a solid section (26) of the said second slide. Furthermore, when the said rotary slide valve is in the closed position, the solid section (28) of the said first slide is apparent. In this case, no communication is possible between the said animal waste discharge pipe (3) and the said area for accommodating the animal (1).

Figure 6:
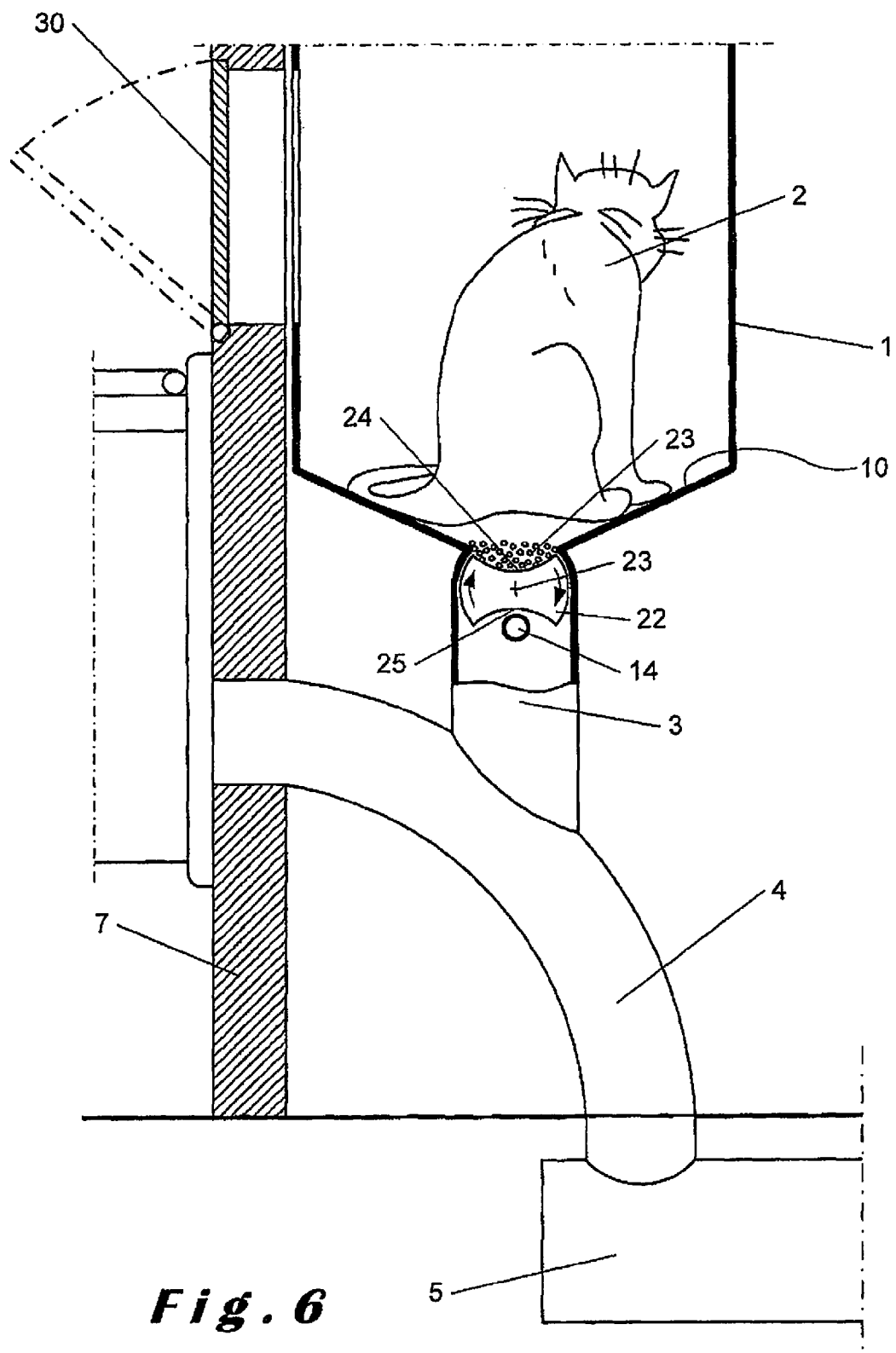
FIG. 6 illustrates a sanitation device for use by a domestic animal with a rotatable sealing device in the form of a cylinder having a plurality of cavities according to the invention.

FIG. 6 illustrates a sanitation device for use by a domestic animal with a rotatable sealing device (11) constituted of a rotary cylinder (22) comprising a horizontal central axis (23) and being placed in the said animal waste discharge pipe (3). The said rotary cylinder (22) is provided with a first cavity (24) and a second cavity (25) that are diametrically opposite, the said first cavity (24) opening towards the said accommodation area (1) for accommodating the animal (2) and being filled with litter material (12) and/or the excretions of the animal (2). A rotation of 180° of the said rotary cylinder (22), along the direction indicated by the arrows, drives the said first cavity (24) and thus the said litter material (12) and/or the said excretions of the animal (2) to the said animal waste discharge pipe (3) wherein the said litter material (12) and/or the said excretions of the animal (2) will drop by gravity. At the same time, during the said rotation of 180°, the said second cavity (25) will be positioned in such a way as to be facing the said accommodation area (1) for accommodating the animal (2). This sanitation device has an identical operation of the other elements (detection sensors, water reservoir, litter material tank, etc.) as described here above in the description of FIG. 1.

It is obviously understood that the present invention is in no way limited to the embodiments described here above and that indeed many modifications may be made thereto without departing from the scope of the appended claims.

For example, provision may be made for the direct access by the animal into the said area for accommodating an animal without an entry through a passage being necessary. In this case, the said area for accommodating an animal may or may not be provided with a closure system, for example with a door.

The invention claimed is:

1. A sanitation device comprising: an area for accommodating a domestic animal which is arranged to receive animal excretions thereof and which includes an animal waste discharge pipe leading into a human waste discharge pipe placed between an area for accommodating humans, which is arranged to receive excretions of the humans, and a sewage discharge pipe line, said area for accommodating the domestic animal further including a rotatable sealing device having a first position for enabling receiving of said animal excretions, and a second position for enabling discharge of said animal excretions, characterised in that said rotatable sealing device separates and isolates said area for accommodating the domestic animal from said animal waste discharge pipe, said rotatable sealing device is a cylinder provided with a central horizontal axis parallel to a horizontal plane, said cylinder having at least two cavities that are diametrically opposite and curved over the entire length of said cylinder in a trigonometric frame of reference of which the axes are superposed over the medians of the section of the cylinder taken in the middle.

2. The sanitation device as claimed in claim 1, characterised in that a water supply pipe is connected to said animal waste discharge pipe.

3. The sanitation device as claimed in claim 1, characterised in that it is connected to a litter material tank being provided with a volumetric dispensing valve and being arranged in order to release a predetermined amount of litter material, said litter material tank having a first open position and a second closed position.

4. The sanitation device as claimed in claim 1, characterised in that it is separated from said area for accommodating the humans by a wall.

5. The sanitation device as claimed in claim 4, characterised in that it includes an access opening for introducing said animal therein formed in the said wall.

6. The sanitation device as claimed in claim 1, characterised in that it has an inclined bottom wall that is inclined at an angle $\alpha$ relative to a horizontal plane passing through a crown of said animal waste discharge pipe.

7. The sanitation device as claimed in claim 1, characterised in that it includes at least one motion detector for detecting a presence of the animal connected to an electronic control-management system.

8. The sanitation device as claimed in claim 1, characterised in that it includes a light source.

9. The sanitation device as claimed in claim 1, characterised in that said animal waste discharge pipe is extended by a siphon.

10. The sanitation device as claimed in claim 1, characterised in that it includes a maintenance hatch.

11. An operation method for operating the sanitation device as claimed in claim 1, for use by a domestic animal including the following sequential steps:
  detection of an entry of a domestic animal into said area for accommodating an animal by at least one motion detector;
  detection of an exit of said domestic animal out of said area for accommodating an animal by at least one motion detector;
  bringing about the rotation of said rotatable sealing device according to a predetermined pitch in order to pass from a first position arranged so as to allow for receiving of the excretions of the animal, to a second position arranged so as to allow for the discharge of the excretions of the animal.

12. An operation method for operating the sanitation device for use by a domestic animal as claimed in claim 11, further including cleaning of said animal waste discharge pipe by flushing by means of supplying a predetermined volume of water from a water reservoir to said animal waste discharge pipe.

13. An operation method for operating the sanitation device for use by a domestic animal as claimed in claim 11, further including the supply of clean litter material from a litter tank to said area for accommodating a domestic animal, the litter tank being provided with a volumetric dispensing valve and having a first open position and a second closed position.

* * * * *